(12) United States Patent
Inagaki (10) Patent No.: US 12,181,085 B2
(45) Date of Patent: Dec. 31, 2024

(54) PIPE JOINT

(71) Applicant: TOYOX CO., LTD., Toyama (JP)

(72) Inventor: Akihiro Inagaki, Toyama (JP)

(73) Assignee: TOYOX CO., LTD., Toyama (JP)

( * ) Notice: Subject to any disclaimer, the term of this patent is extended or adjusted under 35 U.S.C. 154(b) by 0 days.

(21) Appl. No.: 18/238,900

(22) Filed: Aug. 28, 2023

(65) Prior Publication Data

US 2023/0417349 A1 Dec. 28, 2023

Related U.S. Application Data

(63) Continuation of application No. PCT/JP2022/008508, filed on Mar. 1, 2022.

(30) Foreign Application Priority Data

Mar. 31, 2021 (JP) ................................. 2021-060213

(51) Int. Cl.
*F16L 33/10* (2006.01)
(52) U.S. Cl.
CPC ..................................... *F16L 33/10* (2013.01)
(58) Field of Classification Search
CPC ................................ F16L 33/10; F16L 33/03
USPC ........................................................ 285/23
See application file for complete search history.

(56) References Cited

U.S. PATENT DOCUMENTS

| | | | | |
|---|---|---|---|---|
| 4,635,966 A | * | 1/1987 | Hermann | F16L 33/03 |
| | | | | 285/23 |
| 8,419,076 B2 | * | 4/2013 | Keller | F16L 37/101 |
| | | | | 285/23 |

FOREIGN PATENT DOCUMENTS

| | | |
|---|---|---|
| JP | 2012-189147 A | 10/2012 |
| JP | 5137195 B2 | 11/2012 |
| JP | 5641522 B2 | 11/2014 |
| JP | 2017-067097 A | 4/2017 |
| JP | 2020-133720 A | 8/2020 |

OTHER PUBLICATIONS

International Search Report from the Japanese Patent Office in Application No. PCT/JP2022/008508 dated Apr. 19, 2022.

* cited by examiner

*Primary Examiner* — David Bochna
(74) *Attorney, Agent, or Firm* — The Marbury Law Group, PLLC (57) ABSTRACT

A pipe joint includes a joint main body comprising a nipple disposed in such a manner that a distal end is directed to one side in an axial direction and a hose clamp holding portion provided at a proximal end of the nipple and configured to be brought into abutment with an inner circumferential surface of a hose clamp which is biased in a diametrically narrowing direction so as to hold the hose clamp in a diametrically expanded state.

6 Claims, 8 Drawing Sheets

PIPE JOINT

CROSS-REFERENCE TO RELATED APPLICATION

This patent application is a bypass continuation of PCT International Application No. PCT/JP2022/008508 filed on Mar. 1, 2022, which claims the benefit of priority under 35 USC 119 of Japanese Patent Application No. 2021-060213 filed on Mar. 31, 2021, the entire contents of both of which are incorporated herein by reference for all purposes.

BACKGROUND

Technical Field

The present disclosure relates to a pipe joint.

Description of the Related Art

There have conventionally been proposed pipe joints in which a pipe having flexibility such as a hose or the like is connected to a nipple, and the pipe is fixed with a hose clamp. To attach the hose clamp to the pipe, firstly, gripping pieces are gripped with a pair of pincers so as to keep an inside diameter portion of the hose clamp diametrically expanded, the pipe is inserted through the hose clamp, and the hose clamp is caused to temporarily stand by on the pipe. Then, the pipe is connected to the nipple, the hose clamp is diametrically expanded again, and the hose clamp is attached to the connecting portion between the pipe and the nipple. In this case, when the hose clamp is attached obliquely, there may be a case in which fluid leaks from the connecting portion between the nipple and the pipe, and hence, since accurate work is required, attachment and detachment of the hose take a certain amount of time, sometimes resulting in an increase in time and cost for maintenance and replacement.

In order to reduce the problem like this, for example, in Japanese Patent Publication No. 5641552, there is proposed a pipe joint comprising a hose clamp which includes a nipple comprising a locking collar and a hook which is locked on the locking collar. In addition, in Japanese Patent Publication No. 5137195, there is proposed a pipe joint comprising an outer tube including a locking portion for holding a hose clamp in a diametrically expanded state on a distal end side of a nipple and a release portion where to diametrically narrow the hose clamp on a proximal end side of the nipple and provided on an outer circumference of a pipe and a fixing means such as a fixing ring or the like for fixing the outer tube and the nipple together.

SUMMARY

According to an aspect of the present disclosure, there is provided a pipe joint having a joint main body including a nipple disposed in such a manner that a distal end is directed to one side in an axial direction and a hose clamp holding portion provided at a proximal end of the nipple and configured to be brought into abutment with an inner circumferential surface of a hose clamp which is biased in a diametrically narrowing direction so as to hold the hose clamp in a diametrically expanded state.

BRIEF DESCRIPTION OF THE DRAWINGS

FIGS. 1A and 1B show a pipe joint according to an embodiment of the present disclosure, in which

FIGS. 2A to 2C show a joint main body of the pipe joint according to the embodiment of the present disclosure, in which

FIGS. 3A and 3B are a diagram showing a cover member of the pipe joint according to the embodiment of the present disclosure, in which

FIGS. 4A and 4B are a perspective view showing a hose clamp of the pipe joint according to the present disclosure, in which

FIGS. 5A to 5C are a sectional view corresponding to a section taken along a line A-A in FIG. 1A and showing an assembling procedure of the pipe joint according to the embodiment of the present disclosure, in which

FIGS. 6A and 6B are a drawing showing a state in which the jig is removed in the assembling procedure of the pipe joint according to the embodiment of the present disclosure, in which

FIGS. 7A and 7B show a state in which the hose clamp is connected to the nipple in a stand-by position in a procedure of attaching a pipe to the pipe joint according to the embodiment of the present disclosure, in which

FIGS. 8A and 8B are a drawing showing a state in which the pipe is fixed with the hose clamp in the procedure of attaching the pipe to the pipe joint according to the present disclosure, in which

DESCRIPTION OF THE EMBODIMENT

Figure 1A:
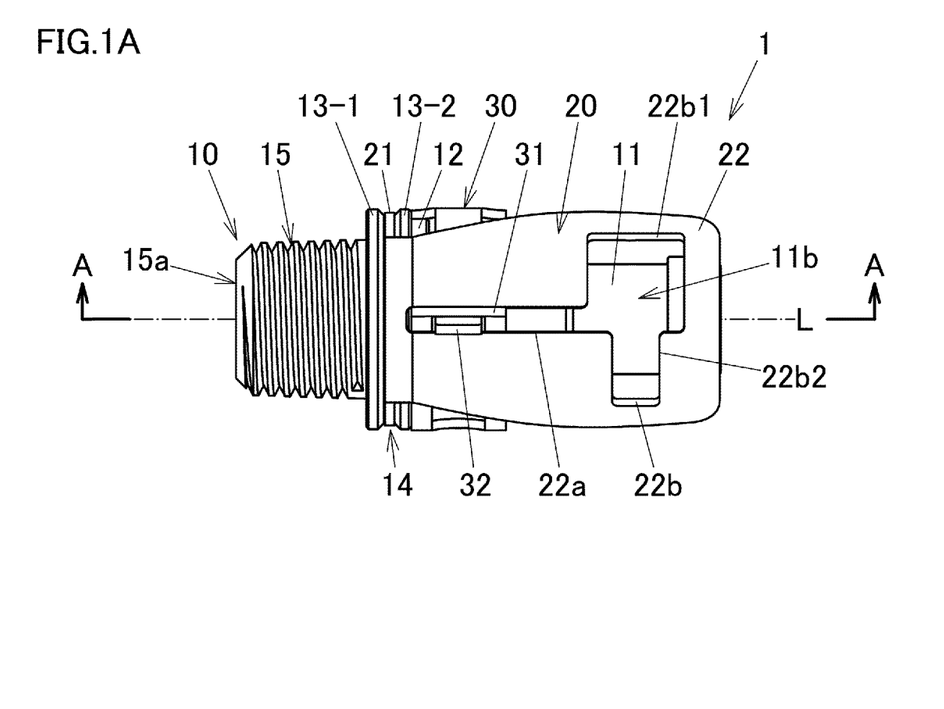
FIG. 1A is a plan view.
Figure 1B:
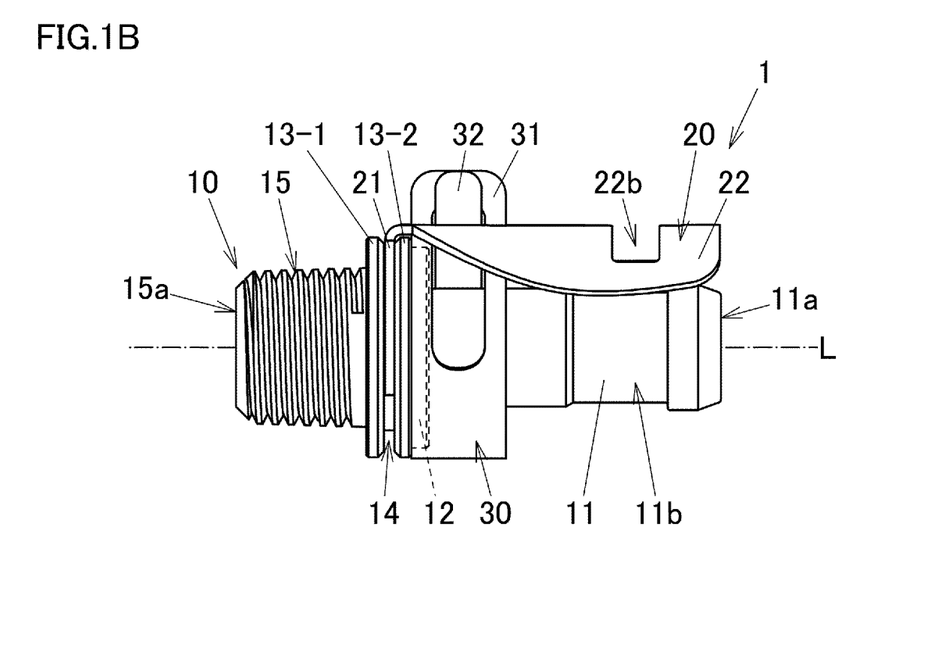
FIG. 1B is a side view.

An embodiment of the present disclosure will be described based on drawings. As shown in FIGS. 1A and 1B, a pipe joint 1 has a joint main body 10, a cover member 20, and a hose clamp 30. The joint main body 10 is formed, for example, by cutting a circular cylindrical material of a metallic material such as brass, stainless steel, and the like or a resin material. The joint main body 10 is formed substantially into a circular cylindrical shape and includes a fluid flow path 18 (refer to FIG. 2C) in an interior thereof. The joint main body 10 has a nipple 11 which is disposed in such a manner that a distal end 11a is directed to one side in an axial direction indicated by an axis L. A concave/convex surface 11b is formed on an outer surface of the nipple 11 to prevent an easy disconnection of a pipe such as a hose or the like when the pipe is connected to the nipple 11.

Figure 2A:
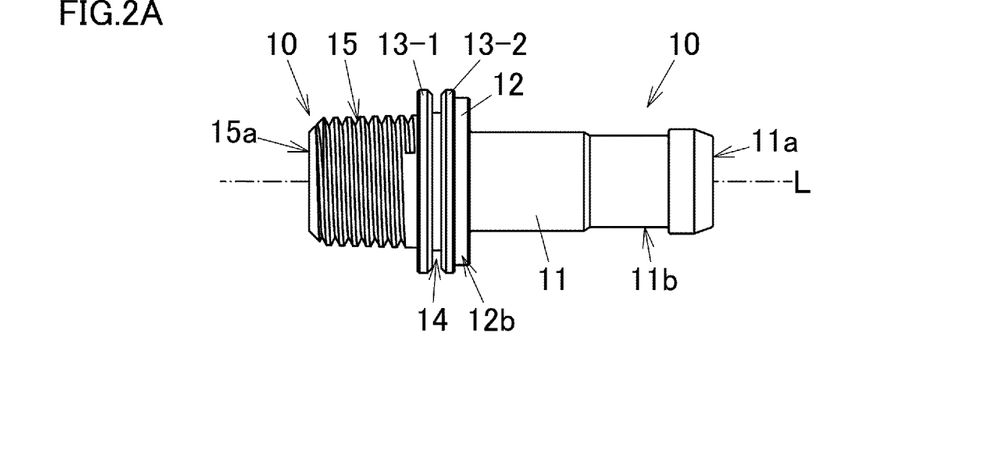
FIG. 2A is a side view.
Figure 2B:
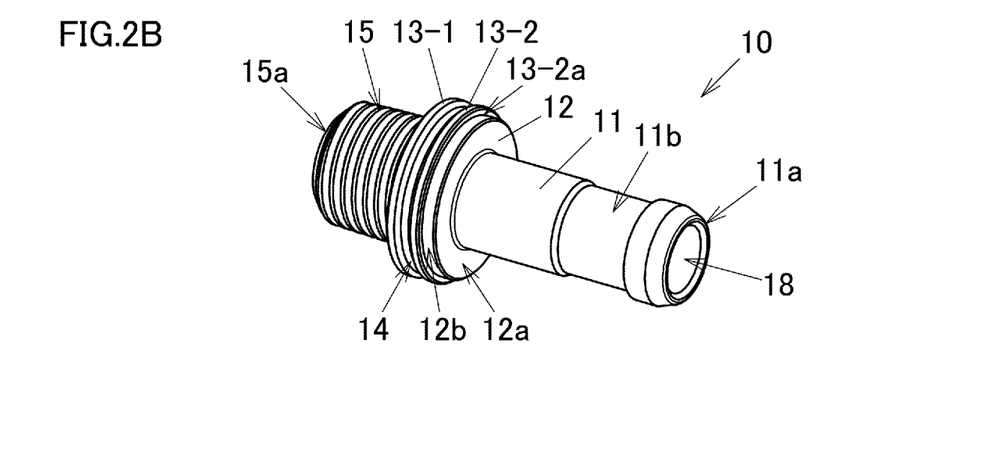
FIG. 2B is a perspective view as viewed from a distal end side of a nipple.
Figure 2C:
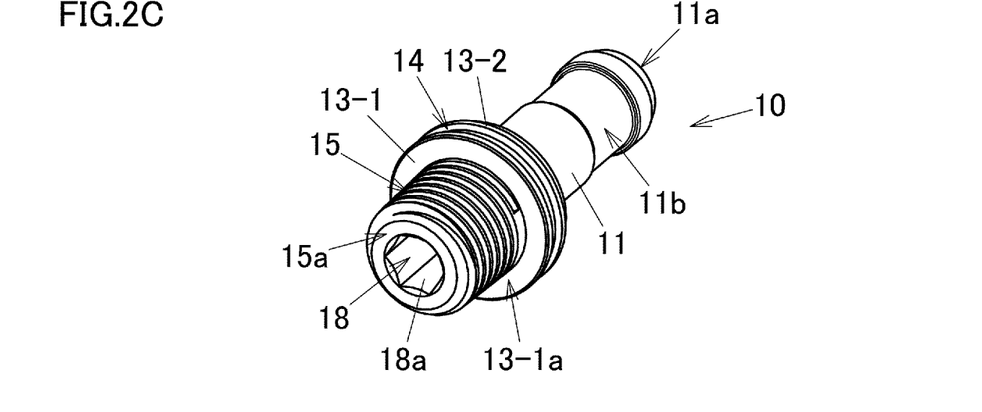
FIG. 2C is a perspective view as viewed from a proximal end side of the nipple.

As shown in FIGS. 2A to 2C, a hose clamp holding portion 12 is provided at a proximal end of the nipple 11. The hose clamp portion 12 is formed annularly around an outer circumference of the proximal end of the nipple 11. An end face of a pipe which is connected to the nipple 11 is brought into abutment with a surface 12a of one side of the hose clamp holding portion 12. A diameter of the hose clamp portion 12 is formed equal to or larger than a diameter of the pipe which is connected to the nipple 11.

An annular groove portion 14 is provided on the other side of the hose clamp holding portion 12 in the axial direction (in other words, an opposite side to the distal end 11a of the nipple 11). The groove portion 14 is defined by a first collar portion 13-1 provided on the other side in the axial direction and a second collar portion 13-2 which is provided closer to the one side than the first collar portion 13-1. A width of the groove portion 14 is substantially the same as a plate thickness of a fixing portion 21 of the cover member 20, which will be described later, or is slightly wider than the plate thickness. The second collar portion 13-2 is provided on the other side of the hose clamp holding portion 12 in the axial direction where the second collar portion 13-2 is adjacent to the hose clamp holding portion 12.

A male threaded part 15 is formed on the other side of the first collar portion 13-1 in the axial direction for connection with another piping or a fluid discharge port. A hexagonal hole portion 18a is provided on the other side of the flow path 18 in the axial direction in such a manner as to correspond substantially to the male threaded part 15. The hexagonal hole portion 18a is formed over an area defined in the axial direction from a rear end of the joint main body 10 (a rear end 15a of the male threaded part 15) to a close proximity to the surface 13-2a on the one side of the second collar portion 13-2 in the axial direction (refer to FIGS. 5B and 5C). This area including the portion of the flow path 18 corresponding to the male threaded part 15 is formed thicker than a portion of the flow path 18 which corresponds to the nipple 11, thereby making it possible to reduce the deformation or the like of the joint main body 10 even when a hexagonal wrench is inserted from a distal end side of the nipple 11 for connection with a piping or the like.

Figure 3A:
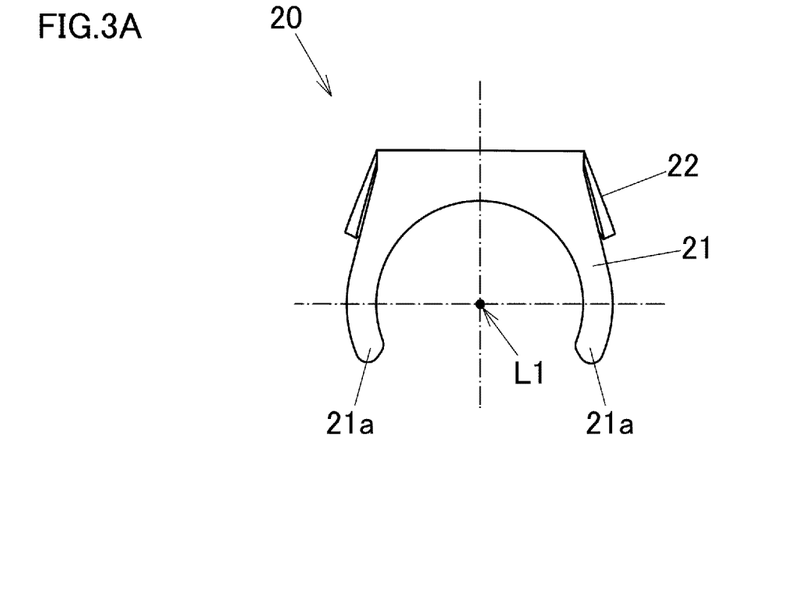
FIG. 3A is a side view as viewed from a fixing portion side.
Figure 3B:
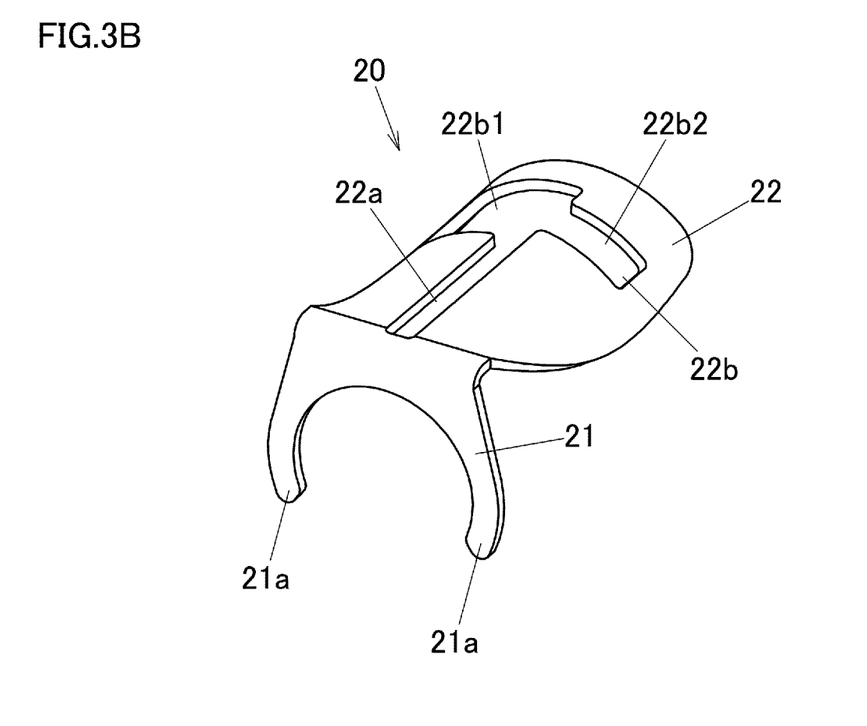
FIG. 3B is a perspective view as viewed from the fixing portion side.

As shown in FIGS. 3A and 3B, the cover member 20 is formed of a sheet metal material of iron, stainless steel, or the like. The cover member 20 has the fixing portion 21 of a C-like annular shape. The fixing portion 21 is formed in such a manner as to press fit in the groove portion 14 of the joint main body 10. More specifically, an inside diameter of the C-like annular shape of the fixing portion 21 is formed smaller than an outside diameter of the groove portion 14 to a slight extent. Additionally, as shown in FIG. 3A, end portions 21a of the C-like annular shape of the fixing portion 21 extend further downwards than an axial center L1 of the C-like annular shape. In this way, the fixing portion 21 of the cover member 20 is caused to press fit in the groove 14 of the joint main body 10 strongly and rigidly. When the cover member 20 is fixed to the joint main body 10, the axial center L1 of the C-like annular shape of the fixing portion 21 substantially coincides with the axis L.

A guide piece 22, which extends from an upper end portion of the fixing portion 21 to the one side which is substantially parallel to the axial center L1, is formed on the cover member 20. When it is attached to the joint main body 10, the guide piece 22 is disposed on the one side in the axial direction. A guide portion 22a, which is formed into a slit shape from a side which faces the fixing portion 21 towards a projecting end of the guide piece 22, and a release portion 22b, which connects with the guide portion 22a and intersects the guide portion 22a at substantially right angles thereto, are provided in the guide piece 22. With the guide piece 22 attached to the joint main body 10, the guide portion 22a is provided from the proximal end of the nipple 11 towards the one side in the axial direction. The release portion 22b has a first release portion 22b1 and a second release portion 22b2. The first release portion 22b1 and the second release portion 22b2 are opening portions which are provided to face each other across the guide portion 22a. The first release portion 22b1 is formed wider than the second release portion 22b2.

Figure 4A:
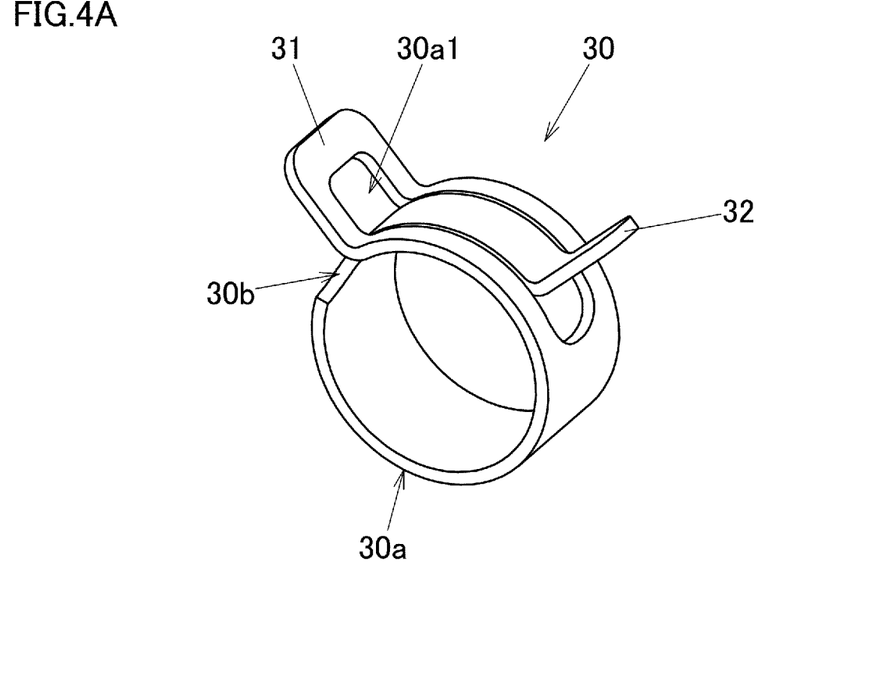
FIG. 4A shows a diametrically narrowed state.
Figure 4B:
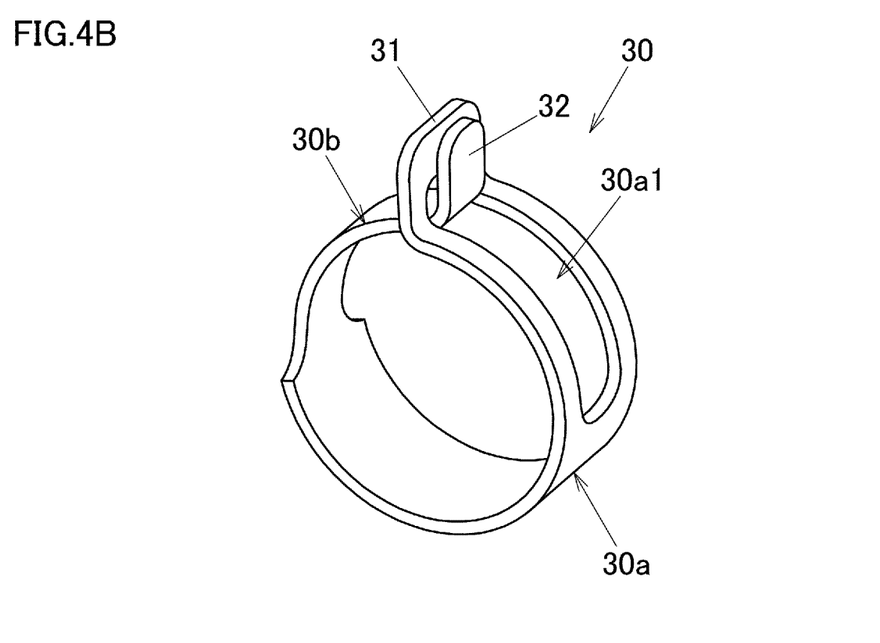
FIG. 4B shows a diametrically expanded state.

As shown in FIGS. 4A and 4B, the known hose clamp 30 is formed of a substantially ring-shaped sheet metal member of a spring steel material such as iron or stainless steel. Two facing gripping pieces 31, 32 are provided in such a manner as to be erected outwardly from a ring-shaped hose clamp main body 30a. The hose clamp 30 is biased in a direction in which an inside diameter of the hose clamp main body 30a is diametrically narrowed as a result of the other end portion side which connects to the gripping piece 32 being disposed in an opening portion 30a1 on one end portion side of the hose clamp main body 30a which connects to the gripping piece 31. Consequently, when the gripping pieces 31, 32 are operated in such a manner that facing surfaces of the gripping pieces 31, 32 overlap each other against this biasing force, the inside diameter of the hose clamp main body 30a is put in a diametrically expanded state as shown in FIG. 4B, whereas when the gripping pieces 31, 32 are released, the inside diameter is diametrically narrowed as shown in FIG. 4A. In addition, the gripping piece 31 and a portion connecting to the gripping piece 31 are formed wider than the gripping piece 32 and a portion connecting to the gripping piece 32. That is, the gripping piece 32 and the portion connecting to the gripping piece 32 are formed narrower in width at a narrower portion 30b.

As shown in FIGS. 1A and 1B, the hose clamp 30 is held to the hose clamp holding portion 12 of the joint main body 10 in a diametrically expanded state. At this time, an outer circumferential surface 12b of the hose clamp holding portion 12 is in abutment with an inner circumferential surface of the hose clamp main body 30a (refer to FIGS. 2A to 2C and FIGS. 4A and 4B). In addition, when the hose clamp 30 is held to the hose clamp holding portion 12 in the diametrically expanded state, the facing surfaces of the gripping pieces 31, 32 move towards each other and are inserted through the guide portion 22a. In other words, a slit width of the guide portion 22a is formed to a width which is substantially the same as a state in which the gripping pieces 31, 32 come close to each other. That is, the gripping pieces 31, 32 are restrained from moving in the diametrically narrowing direction of the hose clamp 30 also by the guide portion 22a. The width of the guide portion 22a has a slight clearance with respect to a state in which the gripping pieces 31, 32 are in total abutment with each other. Thus, the gripping pieces 31, 32 (that is, the hose clamp 30) are allowed to move to the one side in the axial direction along the guide portion 22a by gripping the gripping pieces 31, 32 which are positioned in the guide portion 22a with a pair of pincers or the like.

The gripping pieces 31, 32 of the hose clamp 30 are guided from the proximal end of the nipple 11 towards the one side in the axial direction while being held in the diametrically expanded state by the guide portion 22a. Then, when the gripping pieces 31, 32 arrive at the release portion 22b, the wider gripping piece 31 is released (biased) in a direction in which the gripping pieces 31, 32 move away from each other in the first release portion 22b1, while the narrower gripping piece 32 is released (biased) in the direction in which the gripping pieces 31, 32 move away from each other in the second release portion 22b2.

Figure 5A:
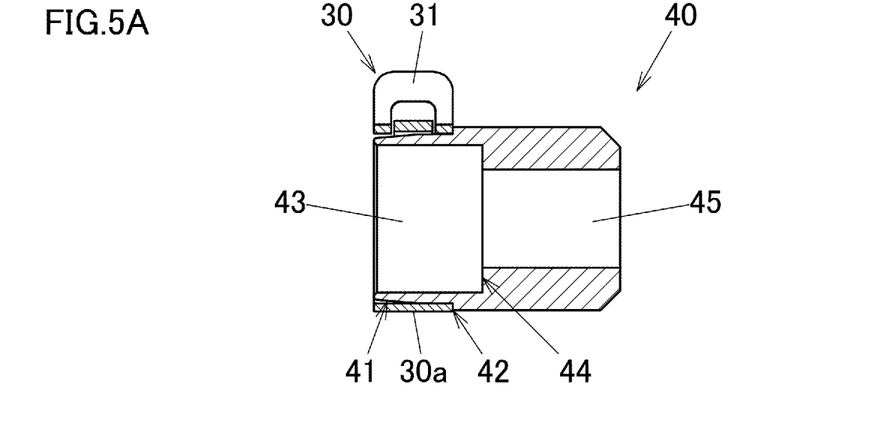
FIG. 5A shows a state in which the hose clamp is attached to a jig.

An assembling procedure of the pipe joint 1 formed in the way described above will be described based on FIGS. 5A to 5C, FIGS. 6A and 6B). Firstly, as shown in FIG. 5A, the hose clamp 30 is attached to a band inserting jig 40. The jig 40 is formed of a metallic material or a resin material which is worked substantially into a circular cylindrical shape. A taper portion 41 and a step portion 42 at a proximal end of the taper portion 41 are formed on an outer circumferential surface of one end of the jig 40. Then, a side of a circular cylindrical inner circumferential surface where the taper portion 41 is provided is made into a large diameter portion 43, which is connected to a small diameter portion 45 via a step portion 44. The hose clamp 30 is firstly put in the diametrically expanded state by causing the gripping pieces 31, 32 to move towards each other with a pair of pincers or the like, and the taper portion 41 of the jig 40 is inserted into an inner circumferential surface of the hose clamp main body 30a, so that the hose clamp 30 is attached to the jig 40.

Figure 5B:
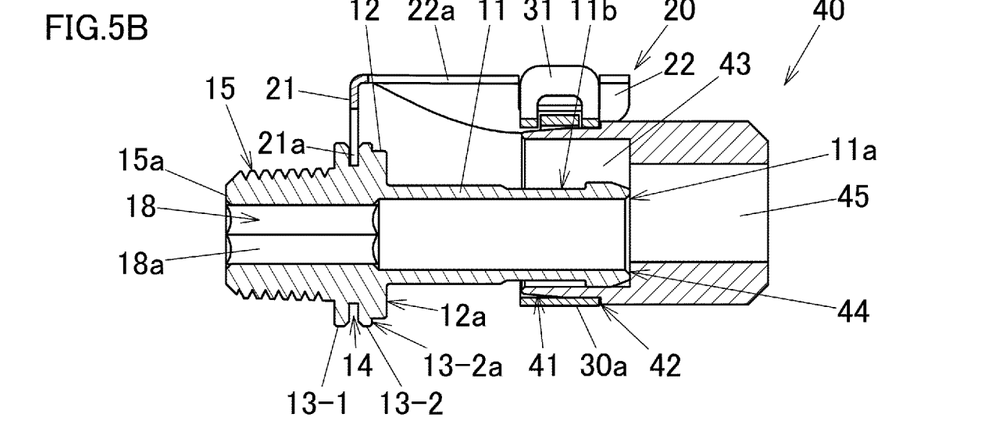
FIG. 5B shows a state in which the jig to which the hose clamp is attached and the cover member are set on the joint main body.

Subsequently, the distal end 11a of the nipple 11 is brought into abutment with the step portion 44 of the jig 40 to which the hose clamp 30 is attached. At this time, as shown in FIG. 5B, the distal end 11a of a portion opposite to the gripping pieces 31, 32 (a lower side portion in FIG. 5B) and the step portion 44 are brought into abutment with each other. With the distal end 11a and the step portion 44 being brought into abutment with each other at the lower side portion in advance in this way, when the fixing portion 21 of the cover member 20 is aligned with the groove portion 14 of the joint main body 10, the gripping pieces 31,32 come to be located in a position corresponding to the release portion 22b, whereby the gripping pieces 31, 32 are exposed from the release portion 22b. That is, an axial length of the large diameter portion 43 is set so that the gripping pieces 31, 32 are exposed from the release portion 22b when the distal end 11a and the step portion 44 are brought into abutment with each other.

Figure 5C:
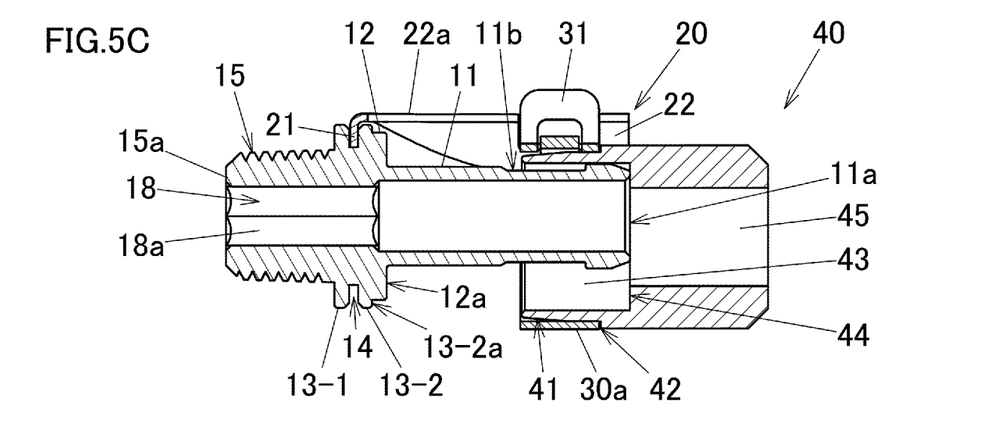
FIG. 5C shows a state in which the cover member is press fitted in the joint main body.
Figure 6A:
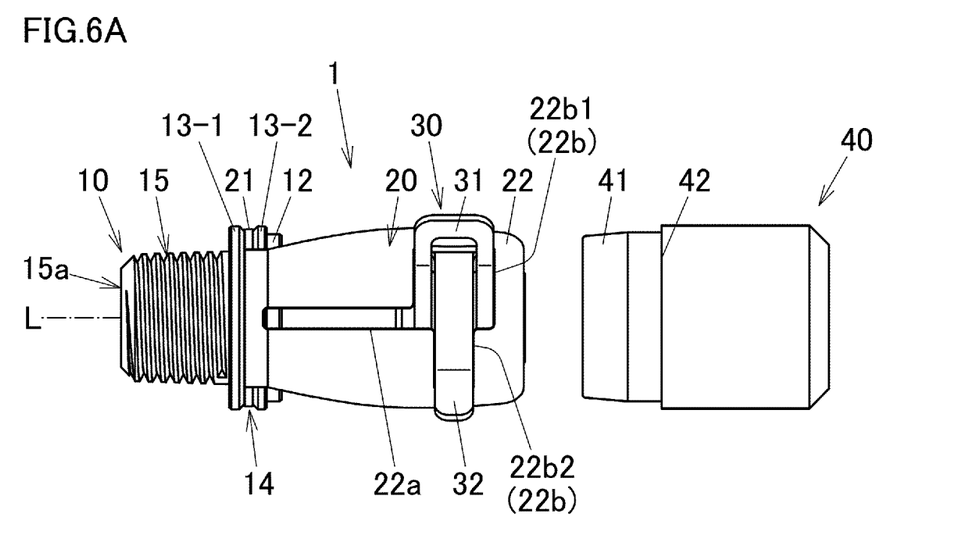
FIG. 6A is a plan view.
Figure 6B:
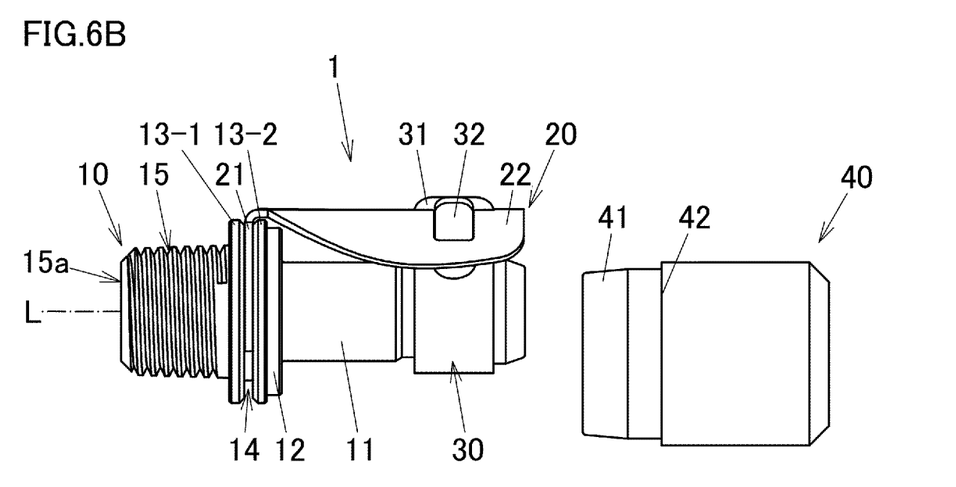
FIG. 6B is a side view.

Subsequently, as shown in FIG. 5C, the cover member 20 is pushed in with respect to the joint main body 10, so that the fixing portion 21 of the cover member 20 is press fitted in the groove portion 14. Specifically, the fixing portion 21 of the C-like annular shape of the cover member 20 is sprung back to thereby be diametrically expanded, and the fixing portion 21 is attached to the groove portion 14 by means of a restoring force thereof. When the cover member 20 is fixed, as shown in FIGS. 6A and 6B, the jig 40 is pulled to be detached. At this time the gipping pieces 31, 32 are restricted from moving in the axial direction of the axis L by the first release portion 22b1 and the second release portion 22b2 of the release portion 22, respectively. Then, when an attachment state of a pipe 60 is set, the gripping pieces 31, 32 are gripped by a tool such as a pair of pincers or the like so as to put the hose clamp 30 in the diametrically expanded state, and the gripping pieces 31, 32 which are made to move towards each other are moved to the other side in the axial direction (towards a proximal end side of the nipple 11) along the guide portion 22a. Then, an end face of the hose clamp 30 on the other side in the axial direction is brought into abutment with the surface 13-2a of the second collar portion 13-2 on the one side in the axial direction, whereby the position is restricted without any inclination. Then, when the gripping pieces 31, 32 which are gripped together by the pair of pincers or the like are released, an inner circumferential surface of the hose clamp main body 30a of the hose clamp 30 and the outer circumferential surface 12b of the hose clamp holding portion 12 are brought into abutment with each other, whereby the hose clamp 30 is held in the diametrically expanded state, resulting in the state shown in FIGS. 1A and 1B.

Figure 7A:
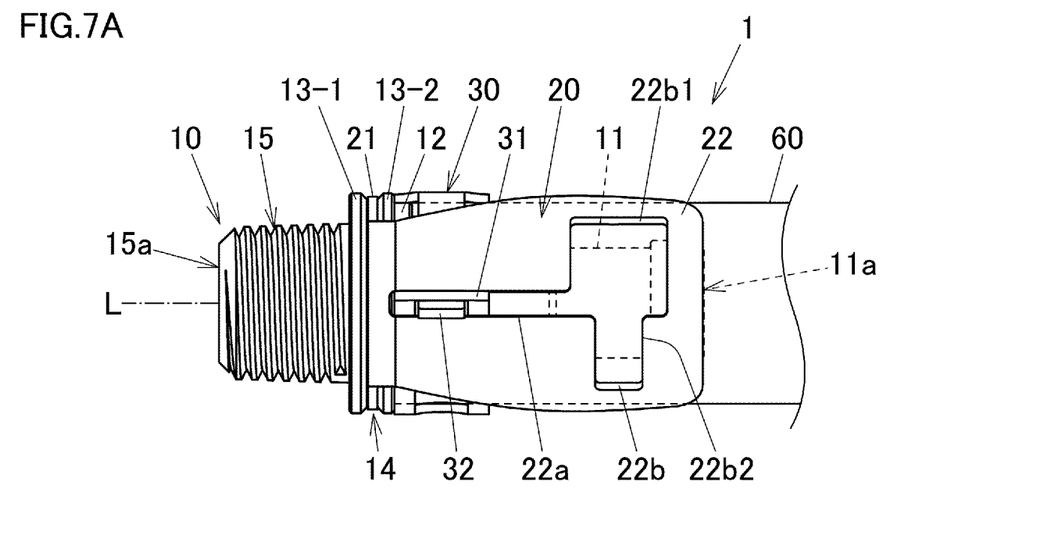
FIG. 7A is a plan view.
Figure 7B:
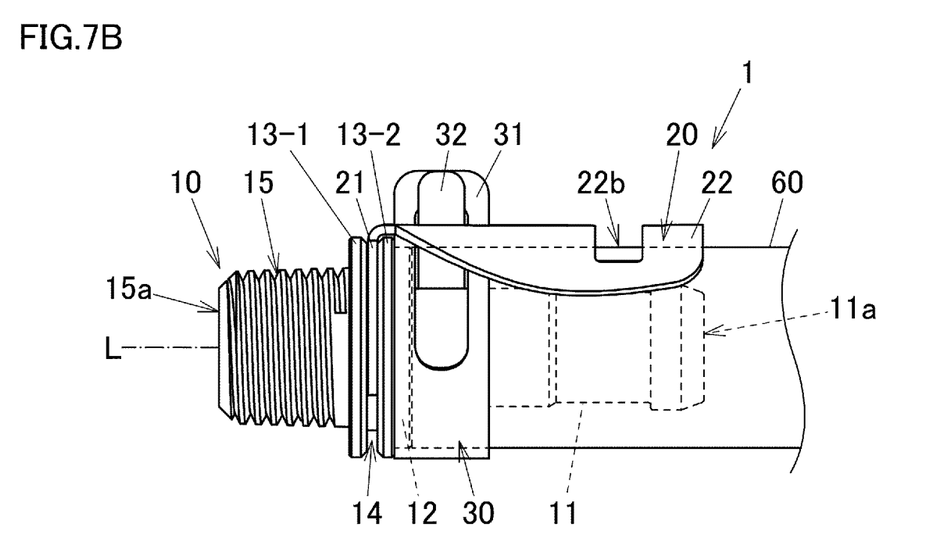
FIG. 7B is a side view.
Figure 8A:
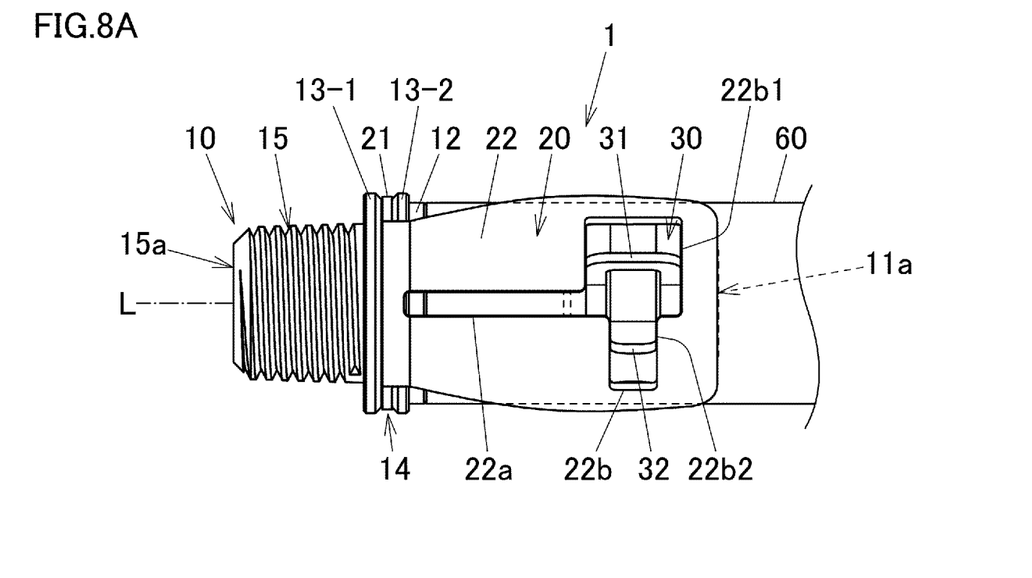
FIG. 8A is a plan view.
Figure 8B:
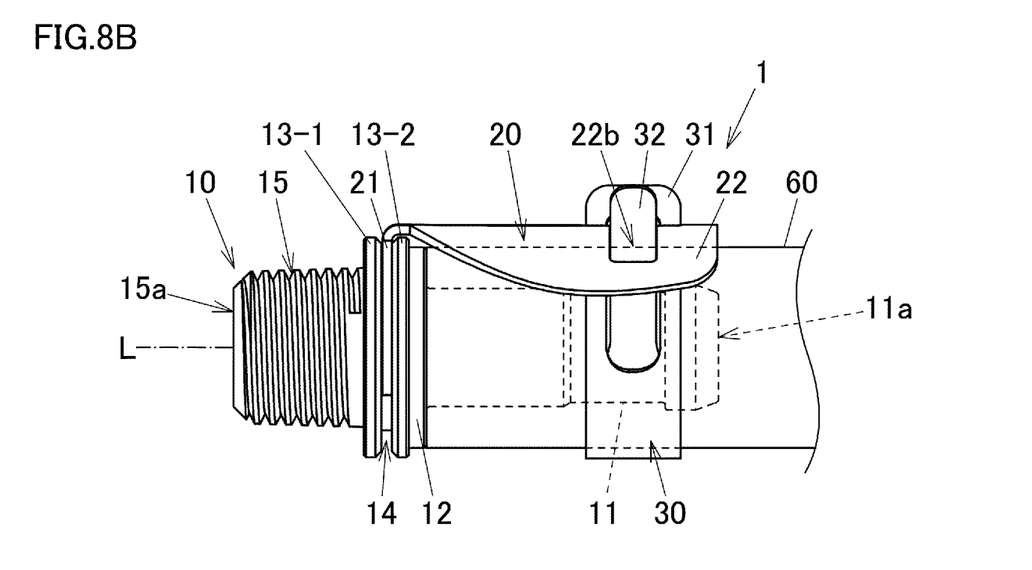
FIG. 8B is a side view.

For attachment of the pipe 60, which is a hose or the like, as shown in FIG. 7A, firstly, the pipe 60 is placed from the distal end 11a of the needle 11. The pipe 60 can be placed to such an extent that a distal end face of the pipe 60 is brought into abutment with the surface 12a of the one side of the hose clamp holding portion 12 in the axial direction. After the pipe 60 is placed completely, the gripping pieces 31, 32 are gripped by the pair of pincers or the like so that the gripping pieces 31, 32 (the hose clamp 30) are moved along the guide portion 22a to be positioned in the release portion 22b. Then, when the pair of pincers or the like which grips the gripping pieces 31, 32 is released, the gripping pieces 31, 32 move in the diametrically narrowing direction, whereby the pipe 60 is fastened to be fixed by the hose clamp 30.

As a result, by adopting the configuration in which the hose clamp 30 is prevented from being attached and detached after the joint main body 10 and the cover member 20 are assembled together, an operator can neither attach nor detach the hose clamp 30 easily. As a result, the hose clamp 30 can be prevented from being lost, or even in the event that the gripping pieces 31, 32 are erroneously dislocated from the pair of pincers or the like, there is no risk of the hose clamp 30 jumping out of its position, whereby the operation can be performed safely.

In addition, for detachment of the pipe 60 from the pipe joint 1, the gripping pieces 31,32 of the hose clamp 30 are gripped with the pair of pincers or the like so as to be moved to the other side in the axial direction along the guide portion 22a so that the hose clamp 30 is kept held at the hose clamp holding portion 12, whereby the pipe 60 can be detached from the nipple 11 easily.

The following describes a pipe joint according to the embodiments of this disclosure in comparison with the above-described prior art. With the pipe joint disclosed in Japanese Patent Publication No. 5641552, the hose clamp is required to temporarily stand by on the pipe, and at this time, the pipe may be deformed or damaged by the hook of the hose clamp or as a result of the pipe being fastened. In addition, with the pipe joint disclosed in Japanese Patent Publication No. 5137195, since the hose clamp moves in association with the insertion of the pipe, the hose clamp is attached while being diametrically narrowed irrespective of the connection state of the pipe and the nipple. As a result, this configuration is inconvenient when the hose clamp is desired to be attached after confirming the connection state of the pipe and the nipple.

In contrast, the pipe joint 1 according to an aspect of the present disclosure has the joint main body 10 which includes the nipple 11 which is disposed in such a manner that the distal end 11a is directed to the one side in the axial direction and the hose clamp holding portion 12 which is provided at the proximal end of the nipple 11 and configured to be brought into abutment with the inner circumferential surface of the hose clamp main body 30a of the hose clamp 30 which is biased in the diametrically narrowing direction so as to hold the hose clamp 30 in the diametrically expanded state. As a result, the pipe 60 is placed on the nipple 11 in such a state that the hose clamp 30 is caused to temporarily stand by on the hose clamp holding portion 12, and thereafter, the hose clamp 30 is moved towards the distal end side of the nipple 11, whereby the hose clamp 30 can be attached. Consequently, since the hose clamp 30 does not have to be attached to the pipe 60 in advance, the pipe 60 is prevented from being damaged by the hose clamp 30, and also when the pipe 60 is detached, the hose clamp 30 can be caused to temporarily stand by on the hose clamp holding portion 12, whereby the hose clamp 30 is prevented from being lost or the like. As a result, the pipe joint 1 can be provided which can not only ensure the connection of the pipe 60 to the nipple 11 but also facilitate the attachment and detachment of the pipe 60 to and from the nipple 11. Then, since the placing work of the pipe 60 on the nipple 11 becomes easy, and the placed state of the pipe 60 on the nipple 11 can be confirmed visually, the maintenance and replacement work can be performed easily with little time spent.

Further, the gripping pieces 31, 32 of the hose clamp are disposed in the release portion 22b of the cover member 20 in such a manner as to project therefrom when the pipe 60 is attached, whereby when a pressure is applied to the pipe 60, and a force works in the direction in which the pipe 60 is dislocated during the use of the pipe 60, both are brought into contact with each other, thereby leading to an improvement in dislocation and water leakage preventing properties.

Here, while the hose clamp holding portion 12 is formed into the ring shape in the present embodiment, the hose clamp holding portion 12 only need hold the hose clamp 30 in the diametrically expanded state, and hence, for example, a configuration may be adopted in which the hose clamp 30 is held in the diametrically expanded state by projections which are provided annularly at intervals or two or three projections.

In addition, the hose clamp 30 is held in the diametrically expanded state in which the inside diameter is equal to or larger than the diameter (the outside diameter) of the pipe 60 which is connected to the nipple 11 by the hose clamp holding portion 12. As a result, the movement from the hose clamp holding portion 12 to the pipe 60 placed over the nipple 11 can be performed smoothly.

In addition, the pipe joint 1 has the cover member 20 which includes the guide portion 22a and the release portion 22b. As a result, when attaching and detaching the hose clamp 30 to and from the pipe 60 which is placed over the nipple 11, even though the gripping pieces 31, 32 are gripped by the pair of pincers or the like and the gripping pieces 31, 32 are erroneously dislocated from the pair of pincers or the like, the hose clamp 30 is prevented from jumping out, whereby not only is the hose clamp 30 prevented from being lost, but also the operation can be performed safely.

In addition, the cover member 20 is fixed as a result of the fixing portion 21 being press fitted in the groove portion 14. The groove portion 14 is provided closer to the other side in the axial direction than the hose clamp holding portion 12. As a result, the pipe joint 1 can be produced easily to thereby be provided at low costs.

In addition, the groove portion 14 is formed by the first collar portion 13-1 and the second collar portion 13-2. Then, the surface on the one side of the second collar portion 13-2 is formed so as to be brought into abutment with the end face of the hose clamp 30 on the other side. As a result, the axial movement of the fixing portion 21 which is press fitted in the groove portion 14 is restricted by the first collar portion 13-1 and the second collar portion 13-2. The movement of the hose clamp 30 to the other side can be restricted by the second collar portion 13-2.

Thus, while the embodiment of the present disclosure has been described, the present disclosure is not limited by the embodiment, and hence, the present disclosure can be carried out while various modifications are made thereto.

What is claimed is:

1. A pipe joint comprising:
a joint main body comprising a nipple disposed in such a manner that a distal end is directed to one side in an axial direction;
a hose clamp holding portion provided at a proximal end of the nipple and configured to be brought into abutment with an inner circumferential surface of a hose clamp which is biased in a diametrically narrowing direction so as to hold the hose clamp in a diametrically expanded state; and
a cover member comprising a guide portion formed so as to allow a passage of a gripping piece of the hose clamp and configured to guide the hose clamp from the proximal end of the nipple towards the one side while maintaining the diametrically expanded state of the hose clamp, and a release portion formed so as to allow a passage of the gripping piece of the hose clamp, made to connect with the guide portion on the one side, and configured to release the hose clamp so as to be diametrically narrowed from the diametrically expanded state.

2. The pipe joint according to claim 1,
wherein the hose clamp is held by the hose clamp holding portion in a diametrically expanded state in which an inside diameter is equal to or larger than a diameter of a pipe which is to be connected to the nipple.

3. The pipe joint according to claim 2,
wherein the cover member has a fixing portion which is formed in a C-like annular shape,
wherein the fixing portion is press fitted in a groove portion provided closer to an other side in the axial direction than the hose clamp holding portion so as to be fixed.

4. The pipe joint according to claim 3,
wherein the groove portion is formed by a first collar portion provided on the other side and a second collar portion provided closer to the one side than the first collar portion, and
wherein the second collar portion is provided adjacent to the hose clamp holding portion and is formed so that a surface on the one side can be brought into abutment with an end face of the hose clamp on the other side.

5. The pipe joint according to claim 1,
wherein the cover member has a fixing portion which is formed in a C-like annular shape,
wherein the fixing portion is press fitted in a groove portion provided closer to an other side in the axial direction than the hose clamp holding portion so as to be fixed.

6. The pipe joint according to claim 5,
wherein the groove portion is formed by a first collar portion provided on the other side and a second collar portion provided closer to the one side than the first collar portion, and
wherein the second collar portion is provided adjacent to the hose clamp holding portion and is formed so that a surface on the one side can be brought into abutment with an end face of the hose clamp on the other side.

* * * * *